United States Patent [19]
Duerksen

[11] 3,722,921
[45] Mar. 27, 1973

[54] TRACTOR-TRAILER SIDE TOW CONSTRUCTION

[75] Inventor: Arnold Duerksen, Salinas, Calif.

[73] Assignee: Cochran Western Corp., Salinas, Calif.

[22] Filed: Mar. 24, 1971

[21] Appl. No.: 127,574

[52] U.S. Cl. .................280/473, 280/479, 172/312
[51] Int. Cl. .................................................B60d 1/04
[58] Field of Search......280/473, 472, 477, 413, 412; 214/42 R; 172/312; 56/5, 6

[56] References Cited

UNITED STATES PATENTS

| | | | |
|---|---|---|---|
| 1,413,575 | 4/1922 | Cochran | 280/473 X |
| 3,467,265 | 9/1969 | Miskin et al. | 280/473 X |
| 3,565,459 | 2/1971 | Reid | 280/477 |
| 3,123,380 | 3/1964 | Grim et al. | 280/477 UX |
| 3,501,032 | 3/1970 | Cissel | 214/42 R |
| 2,512,097 | 6/1950 | Goodspeed | 280/413 |
| 2,561,444 | 7/1951 | Martin | 280/150 C |
| 1,291,813 | 1/1919 | Engelhardt | 280/413 X |

FOREIGN PATENTS OR APPLICATIONS

| | | | |
|---|---|---|---|
| 914,794 | 7/1954 | Germany | 280/473 |
| 39,503 | 2/1957 | Poland | 280/412 |

*Primary Examiner*—Leo Friaglia
*Attorney*—Flehr, Hohbach, Test, Albritton & Herbert

[57] ABSTRACT

A towing tractor and towed trailer combination including structure at each of the sides of the trailer which impart side tow capability thereto. The trailer towing structure includes an inclined ramp and communicating socket at each corner of the trailer with which a towing pin of the tractor towing mechanism is removably engageable. The tractor towing mechanism includes hydraulic means at each side of the tractor and associated control mechanism for selectively positioning a tractor towing pin in operative engagement with a trailer ramp and socket structure so that rapid insertion or removal of the towing pin relative to a preselected trailer socket may be effected.

27 Claims, 11 Drawing Figures

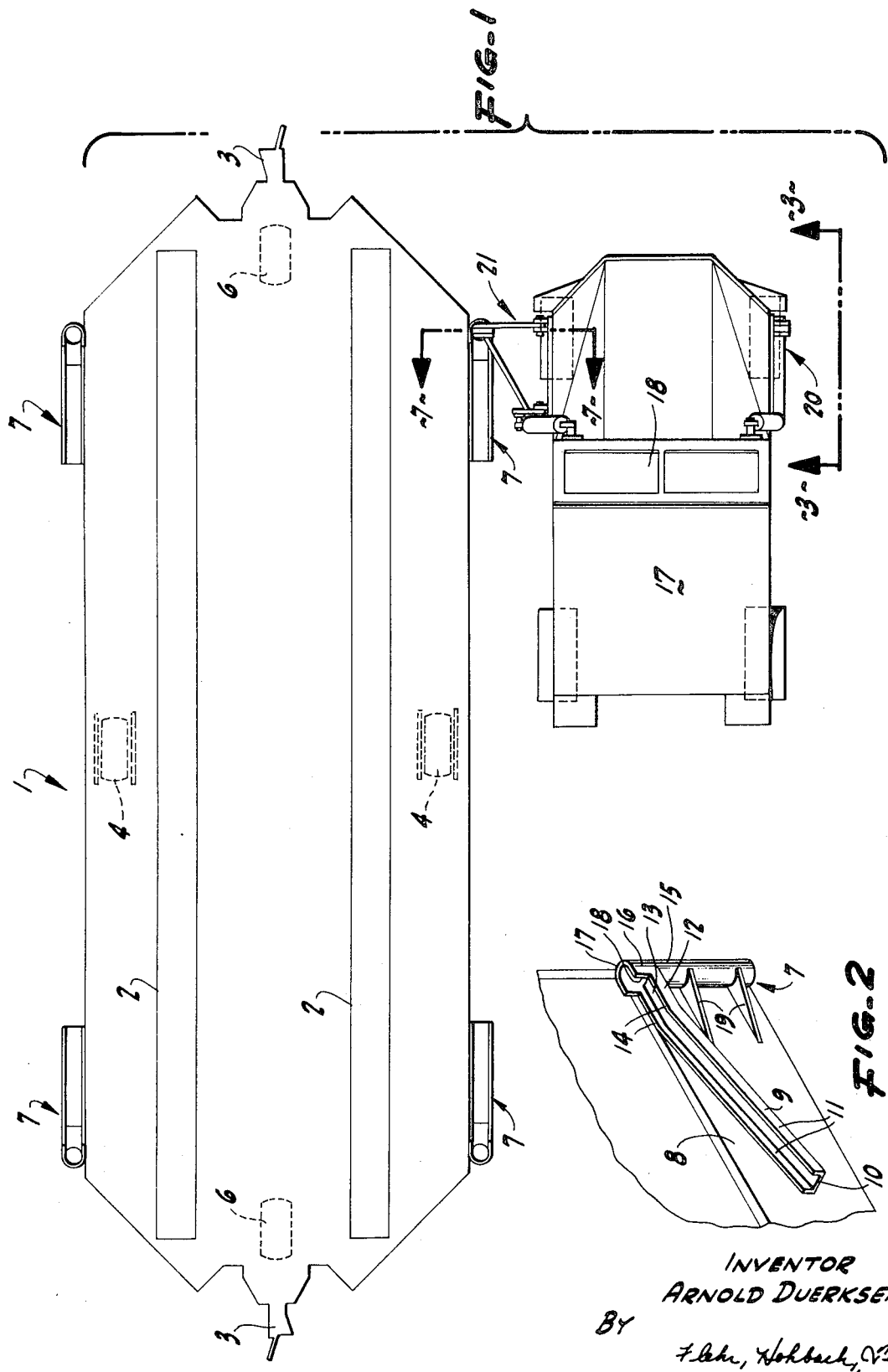

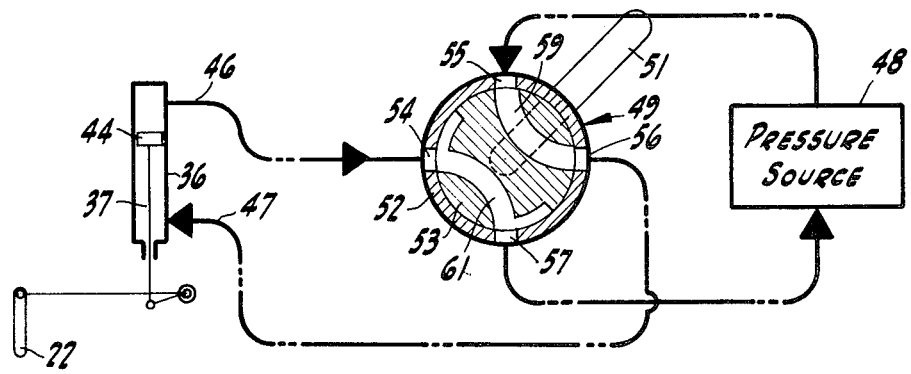
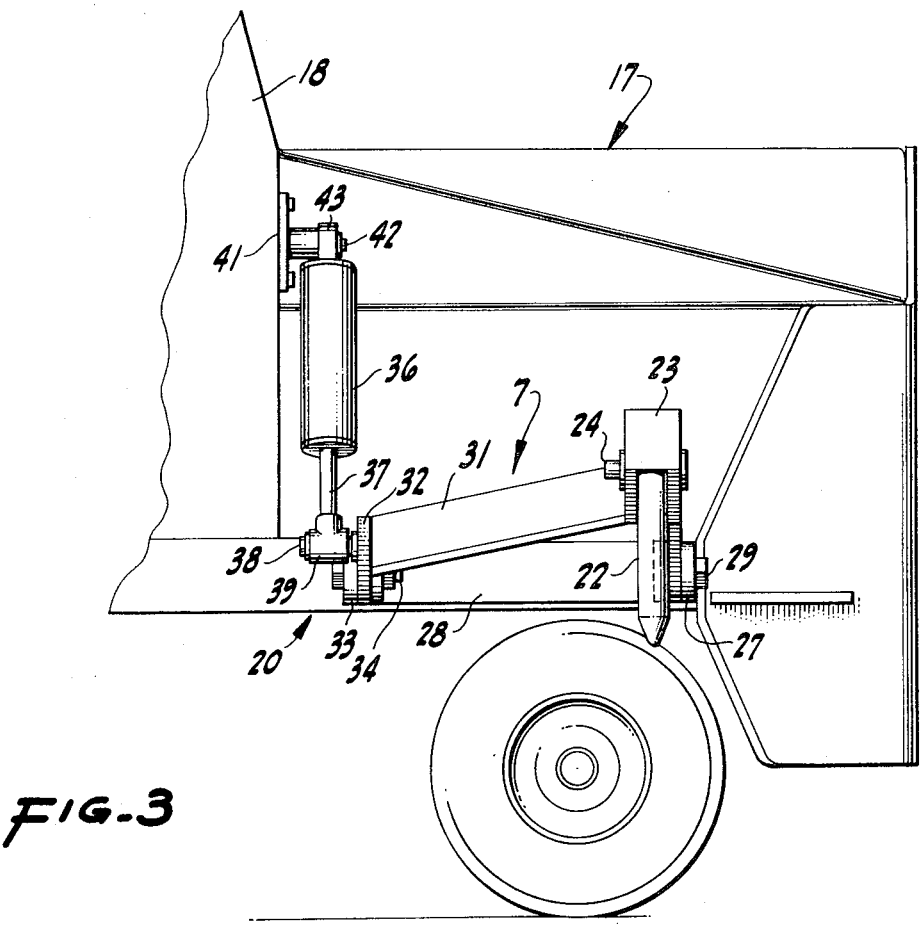

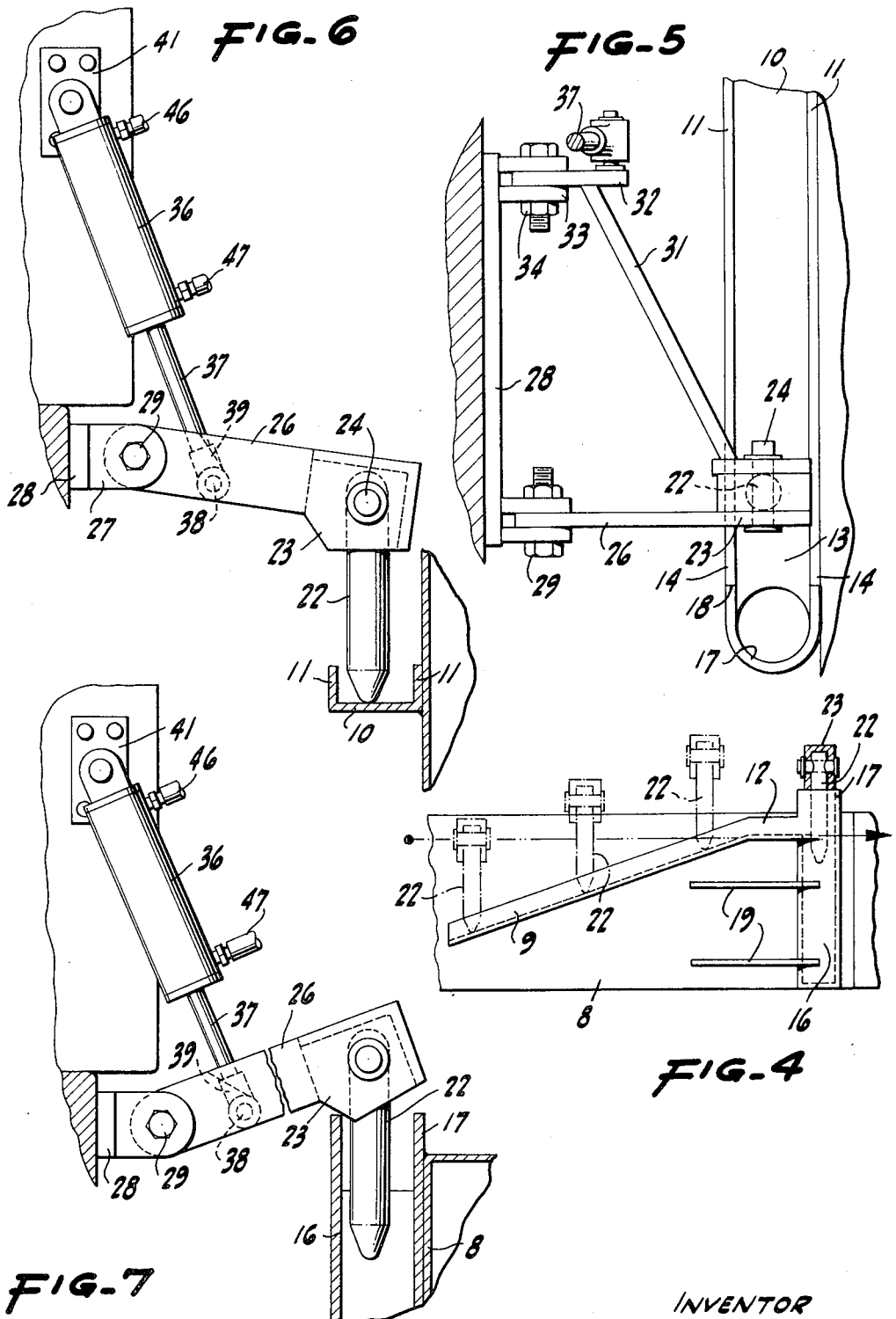

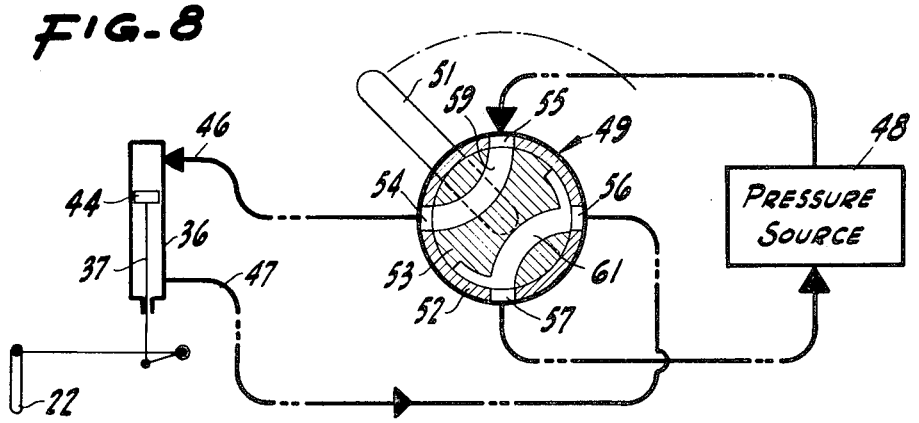
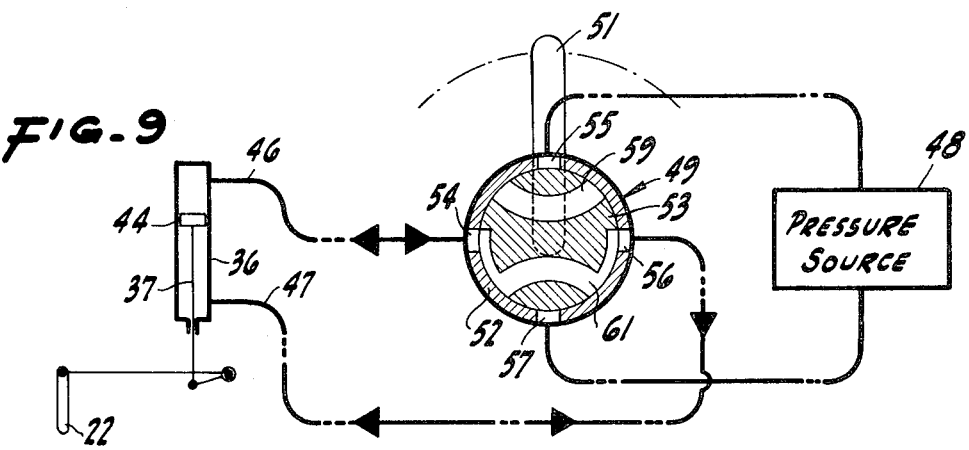
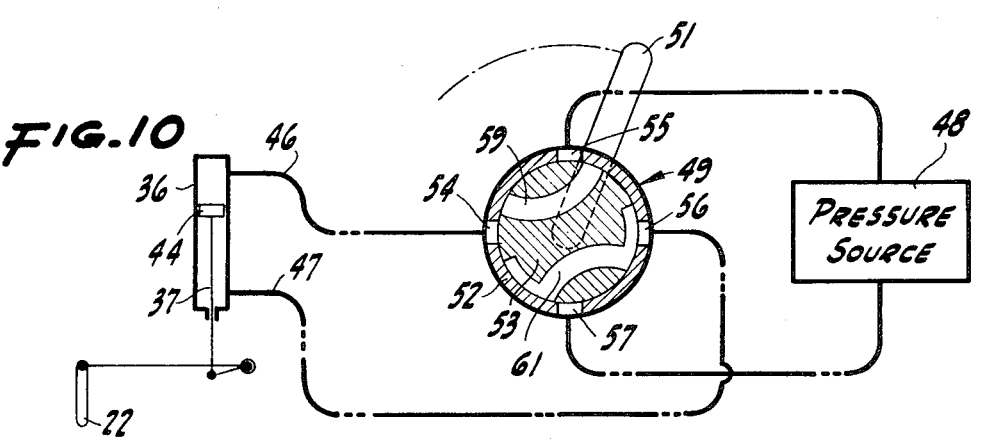

TRACTOR-TRAILER SIDE TOW CONSTRUCTION

CROSS-REFERENCE TO RELATED APPLICATION

Assignee's copending application Ser. No. 81,894, filed Oct. 19, 1970, entitled "Automatic Vehicle Hitch Assembly" discloses automatic coupling structure well suited for use with a side towable trailer construction of the type disclosed herein.

BACKGROUND OF THE INVENTION

1. Field of the Invention

This invention relates to the field of towable vehicles. More particularly, this invention relates to the field of trailer type vehicles which are to be towed by a separate propelling vehicle, such as a tractor or tug. This invention relates specifically to the field of ground support equipment for aircraft, particularly trailers and tow tractors employed to move baggage and cargo relative to an aircraft during loading and unloading thereof.

2. Description of the Prior Art

Various arrangements have been utilized heretofore, particularly in ground support equipment for aircraft, for moving trailer vehicles in towed fashion. Generally, such trailers are towed in in-line relationship relative to the towing tractor. So far as is known, however, side tow vehicles of the type disclosed herein, and side towing structure and mechanism of the type specifically described herein, have been unknown heretofore.

The side tow tractor construction of the type disclosed herein is rapidly engageable with and disengageable from a trailer or like vehicle to be towed and has the capability of rapid coupling and uncoupling without requiring manual intervention. Additionally, with the side tow arrangement disclosed herein, a trailer may be towed from any of its four corners, thereby imparting great flexibility to the movement and positioning of trailer type vehicles by the towing tractor. Thus, irrespective of the location of the trailer when parked, access to one of its four corners will be available so that the same can be coupled rapidly to the tractor for movement to another location.

SUMMARY OF THE INVENTION

This invention relates generally to an improved arrangement for towing vehicles, such as ground support cargo trailers used extensively in the airline industry. More particularly, this invention relates to a side tow arrangement for trailer type vehicles in which a towing tractor and towed trailer are oriented side by side during movement. Still more particularly, this invention relates to an improved combination in towing structure and mechanism by means of which a trailer may be towed from either of its opposite ends and from either side at such opposite ends. Still more particularly, this invention relates to an improved cooperable towing mechanism provided on both sides of a towing tractor and to a trailer socket structure specially designed to cooperate with the tractor mechanism to facilitate rapid interengagement and separation of the towing vehicle and the towed vehicle.

From the foregoing, it should be understood that objects of this invention include the provision of an improved trailer which may be side towed by a self-propelled tractor from either of its opposite ends, and from either side at such ends; the provision of improved structure on a trailer type vehicle to receive therein cooperable towing mechanism of a tractor; the provision of improved towing mechanism on a tractor selectively engageable with cooperable means on a trailer type vehicle to be towed in side by side relationship by the tractor; and the provision of trailer towing socket structure, preferably at each of the four corners of a towable trailer, and improved towing mechanism on a tractor rapidly engageable and removable from a trailer socket structure.

These and other objects of this invention will become apparent from a study of the following description taken in conjunction with the attached drawings.

BRIEF DESCRIPTION OF THE DRAWINGS

FIG. 1 is a plan view of a tractor and trailer combination of the subject invention showing the vehicles operatively coupled in towing relationship.

FIG. 2 is an isometric view of a portion of one corner of the subject trailer showing the improved towing socket structure provided thereat.

FIG. 3 is a side elevational view of a portion of the tractor taken generally in the plane of line 3—3 of FIG. 1 illustrating details of construction of the towing mechanism provided thereon.

FIG. 4 is a generally schematic view showing progressive steps of the interengagement of the tractor towing mechanism with the trailer socket structure.

FIGS. 5 and 6 are plan and elevational views, respectively, showing the towing mechanism of the tractor in an intermediate position prior to full engagement with the trailer socket structure.

FIG. 7 is an elevational view corresponding generally to FIG. 6 and showing the tractor towing mechanism fully engaged with the trailer socket structure.

FIGS. 8 through 11 are schematic views of a control mechanism for regulating selectively the operative position of the towing mechanism of the tractor.

DESCRIPTION OF THE PREFERRED EMBODIMENT

Referring first to FIG. 1, the trailer construction, generally designated 1, illustrated therein is of the type which comprises a generally flat bed over which a pair of metal belt conveyor mechanisms 2 are movable between opposite ends thereof. Movement of such conveyor mechanisms to move cargo along the trailer bed may be effected in any suitable and known fashion and such means for movement thereof forms no part of this invention.

At each of its opposite ends, the trailer is provided with a hitch assembly 3 by means of which such trailer may be coupled with other trailers in a train. Preferably the hitch assemblies employed are of the improved automatic type disclosed in the copending application identified above; however, other suitable hitches also may be employed.

The trailer is supported for movement by a pair of opposed wheel and pneumatic tire assemblies 4 mounted centrally thereof adjacent opposite sides thereof in known fashion. Additionally, to provide directional capability to the trailer, similar wheel and pneumatic tire assemblies 6 are mounted adjacent each of the opposite ends of the trailer along the longitudinal axis thereof. Wheel assemblies 6 are operatively connected with the hitch assemblies 3 at the trailer ends so that pivotal movement of a hitch assembly will effect movement of an associated wheel assembly 6 in known fashion.

It should be understood that the type of trailer with which the subject invention is utilizable may vary within wide ranges, and that the side tow arrangement disclosed herein is adaptable for use with such wide range of trailers, as well as with other types of wheeled vehicles which require towing.

In that regard, this invention imparts substantial flexibility to the towability of a trailer in that towing thereof is possible at any of its four corners and is effected by means of the special towing structure, generally designated 7, provided adjacent each of such corners. Such towing structure, as best seen in FIG. 2, is mounted on a side rail 8, which forms part of the framework of the trailer, in any suitable fashion, preferably by welding.

For the purpose to be described, such towing structure includes a guide ramp which includes an upwardly inclined section 9 which extends from adjacent the lower margin of the side rail 8 upwardly to adjacent the top margin thereof. Such ramp section 9 is defined by a generally flat base portion 10 and a pair of opposed side guide walls 11 which extend the length thereof. At its upper end, the inclined ramp section merges into a generally horizontal section 12 defined by a flat base portion 13 and a pair of opposed side guide walls 14. The upper section 12 of the ramp communicates with vertically oriented socket structure 15 defined by an open ended cylindrical socket 16 which is hollow in construction. The open top end of the socket is defined by a peripherally discontinuous cut away extension 17 which includes a cut out portion 18 in the wall thereof which opens onto the upper ramp section 12. Preferably braces 19 are welded between the side rail 8 of the trailer frame and the socket 16 to insure rigid interconnection of the socket and ramp with the trailer.

It should be understood that each of the socket structures 7 at the respective trailer corners are essentially identical in construction, the only difference being that the socket structures at opposite ends of the trailer are oppositely oriented as seen in FIG. 1 so that the trailer may be towed in either direction from any of its four corners.

The towing vehicle utilized with the subject trailer may take various configurations. In FIG. 1 the exemplary vehicle shown comprises a tractor or tug generally designated 17 which is self-propelled in known fashion. The driver is seated in a cab 18 and the tractor is supported on four wheel assemblies.

Adjacent the front end of the tug at each of its opposite sides are provided extensible and retractable fluid operable towing mechanisms generally designated 20 and 21. In the arrangement shown in FIG. 1, the towing mechanism 21 at the left front corner of the tractor is operatively connected with the trailer socket structure provided at the right front corner of the trailer. It should be understood, however, that the other towing mechanism 20 would be utilizable if the tractor were headed in the opposite direction to tow the trailer in the direction opposite from that shown, or if the trailer were located on the opposite side of the trailer. By providing towing mechanism on both sides of the tractor flexible tow capability is imparted to the tractor-trailer combination.

Details of the towing mechanism are perhaps best seen in FIG. 3 in which the mechanism 20 provided at the right front of the tractor is illustrated. The towing mechanism includes fluid control means, to be described for selectively extending and retracting the same relative to the frame of the tractor so that the towing mechanism may be selectively oriented to meet towing requirements.

In that regard, the towing mechanism includes a solid, elongated, rigid towing pin 22 pivotally mounted on an extensible and retractable framework. The towing pin is secured to said framework through a bracket 23 by means of a headed pivot pin 24 which extends through the upper end of the towing pin and through the bracket. The towing pin is gravity responsive to pivot about the axis of pin 24. Bracket 23 in turn is secured on the outer end of a rigid pin mounting arm 26 which is pivotally secured at its inner end between the arms of a mounting clevis 27. Clevis 27 is secured in any suitable fashion to a member 28 of the chassis or frame of the tractor by welding or other suitable means. A nut and bolt connector 29 maintains mounting arm 26 pivotally engaged with the clevis.

A brace 31 is rigidly interposed by welding or the like between bracket 23 and a link member 32, the latter being pivotally connected between the spaced arms of another clevis 33 secured by welding or the like to the chassis or frame member 28 of the trailer. A nut and bolt connector 34 is employed to pivotally interconnect link 32 with clevis 33.

It should be understood that upon upward or downward movement of link 32 relative to the side of the tractor, towing pin 22 will be extended or retracted into the position desired to effect engagement or disengagement thereof with the trailer socket structure. In that connection, because towing pin 22 is gravity responsive about the axis of pivot pin 24, the towing pin is automatically retracted or automatically extended in accordance with the orientation of mounting arm 26.

Means is provided to selectively extend or retract the towing pin 22, such means being operatively connected with link 32 as best seen in FIG. 3. Such means comprises hydraulic mechanism which includes a hydraulic cylinder 36 of conventional construction in which a dual direction piston is positioned in known fashion. A piston rod 37 extends from the lower end of cylinder 36 and is pivotally connected at its free end by means of a pivot pin 38 and socket 39 with link 32. Thus, upon extension or retraction of piston rod 37 relative to the cylinder, link 32, and the remainder of the towing mechanism, including towing pin 22, may be extended or retracted as desired.

At its upper end, piston 36 is pivotally connected to a mounting bracket 41 which is bolted or otherwise suitably secured to the frame of the tug. A pivot pin 42 and socket 43 are employed to pivotally interconnect the cylinder with the mounting bracket.

As will be described hereinafter, control means for regulating the position of the piston 44 in cylinder 36 is provided, as shown schematically in FIGS. 8 through 11, as will be described hereinafter.

The towing mechanism at a preselected side of the tractor may be rapidly and easily interengaged with a socket structure at a preselected corner of the trailer by positioning the tractor adjacent an accessible corner from which trailer towing is to be effected. When thus oriented, the tractor and trailer will be located generally side by side in the manner seen in FIG. 1. However, referring to FIG. 4, to facilitate full interengagement of towing pin 22 with socket 16 in the fashion seen in FIG. 1, it is desirable preliminarily to position such towing pin for insertion into the socket.

To that end, referring to FIGS. 4, 5 and 6, the tractor is first positioned adjacent the side of the trailer with the towing mechanism only partially extended so that the towing pin may be engaged in the inclined ramp section 9. Thereafter, by utilizing the cylinder control means to be described, the towing pin is regulated so that it may be moved upwardly due to engagement of the free end of the pin with the inclined ramp section as the tractor and trailer are moved relative to each other. Such relative movement results in upward pivotal movement of the towing mechanism as the pin is progressively urged upwardly by the ramp in the progressive fashion noted in FIG. 4.

As the tractor is driven relative to the inclined channel of the stationary trailer the towing pin and its associated towing mechanism are moved upwardly until the end of the towing pin reaches the top of the ramp and is aligned with the open end of hollow socket 16. Because, at that time, the towing pin is free to move in both vertical directions, when the pin becomes aligned with the socket, the pin moves downwardly under the effects of gravity until it is fully received within the socket in the manner seen in FIG. 7 and to the right of FIG. 4. At that time, the cylinder control means to be described is employed to lock the towing pin in place within the socket so that towing of the trailer from one predetermined location to another may be effected. When the trailer is oriented in a second predetermined location, the control means is actuated to retract the towing pin from the socket and the trailer is then free to move away from the trailer for subsequent use.

While the towing pin and socket preferably are progressively interengaged in the fashion shown in FIG. 4, it should be understood that direct insertion of the towing pin into the socket may be effected if the tractor driver is proficient.

Shown schematically in FIGS. 8 through 11 are control means for regulating the position of the piston 44 within the hydraulic cylinder 36 to effect extension or retraction of piston rod 37 and selective movement of the towing pin relative to a trailer socket structure. In that regard, as seen in FIGS. 6 and 7, cylinder 36 includes conventional inlet and outlet ports and conduits 46 and 47 by means of which hydraulic fluid may be introduced selectively against one or the other surface of piston 44 to effect extension or retraction of piston rod attached thereto. Conduits 46 and 47 in turn are selectively connected with a hydraulic reservoir 48 positioned at any suitable location in the tug. Reservoir 48 provides the pressure source for the system.

Interposed between the reservoir and the hydraulic cylinder is a control mechanism generally designated 49 having a control lever 51 operatively engaged therewith. It should be understood that various control mechanisms may be utilized to regulate extension or retraction of piston rod 37 relative to cylinder 36. The mechanism illustrated is shown generally schematically and is intended to be illustrative of one type of control mechanism which may be utilized in that regard.

As shown, the control mechanism includes a fluid tight housing 52 having a rotatable control valve 53 therein. The housing has a series of spaced ports 54, 55 and 56 and 57 extending through the wall thereof so that hydraulic fluid may be selectively moved through the housing or precluded from movement therethrough in accordance with the particular orientation of the valve structure 53 provided therein. In that regard, it should be understood that the control lever 51 is operatively connected to the control valve so that the latter may be selectively oriented in accordance with the function to be performed by the hydraulic cylinder.

In the arrangement shown in FIG. 8, the control lever 51 is oriented in a first operative position in which the direction of flow of hydraulic fluid from the reservoir through the valve housing and into cylinder 36 is indicated by the arrows shown. It will be noted that the valve 53 includes arcuate channels 59 and 61 therethrough, the later having extensions at its ends, which are intended to be selectively aligned or unaligned with the respective ports in the housing wall, depending upon the function to be performed by the hydraulic system.

In the arrangement shown in FIG. 8, channel 59 is aligned with ports 54 and 55 and channel 61 is aligned with ports 56 and 57. As a result, hydraulic fluid pumped from the reservoir 48 in known fashion is directed through the valve structure into the top of cylinder 36 to urge the piston 44 and its attached piston rod 37 downwardly. Such downward movement results in downward movement of link 32 with which the piston rod is pivotally connected and attendant downward movement of the towing mechanism including towing pin 22. By placing lever 51 in the FIG. 8 position, the entire towing structure may be moved from a retracted position, in which it lies essentially flat against the tractor as seen on the right side of the tractor in FIG. 1, to an extended position in which it is alignable and engageable with the socket structure at a preselected corner of the trailer.

When the towing pin 22 is properly aligned with the ramp as seen at the left of FIG. 4, the control handle 51 of the hydraulic system is moved to the second operative position shown in FIG. 9 so that the ramp may urge the pin progessively upwardly as seen in FIG. 4. When in such position, valve channel 59 is unaligned with any ports in housing wall 52 while channel 61 is aligned with the opposed ports 54 and 56. As a result, no fluid may pass into the valve from the reservoir but fluid may flow in a closed path through the valve housing. As a result, piston 44 is directly responsive to upward or downward movement of towing pin 22 and hydraulic fluid will flow in one or the other direction relative to cylinder 36 depending upon movement of piston 44 therein in response to movement of pin 22.

Thus, after the towing pin has been initially engaged with the guide channel and the control lever is placed in the position seen in FIG. 9, the tractor may be moved relative to the guide ramp so that the towing pin may ride upwardly on the ramp, such upward movement being accompanied by an upward movement of the piston 44 in the cylinder. In this condition, the fluid can flow in either direction from the cylinder as shown by the arrows and the piston is free to flow or move in either direction in direct response to movement of the towing pin under the contact effects of the ramp or under the effects of gravity.

Upon continued movement of the towing pin relative to the guide ramp as the tractor is moved relative to the trailer, the towing pin will ultimately reach the uppermost position shown to the right of FIG. 4 at which time it will be aligned with socket 16. Because there is no restriction on downward movement of the towing pin by the hydraulic mechanism when the cylinder is in the free position shown in FIG. 9, the towing pin will descend under the effects of gravity into the socket to the position shown in FIG. 7.

When the pin and socket are thus fully interengaged, the control lever 51 of the hydraulic control mechanism is moved to the third operative position shown in FIG. 10. In such position, neither of the valve channels 59 or 61 is aligned with any of the ports in the housing 52. As a result, no fluid may move through any portion of the hydraulic system and the system is maintained in a static condition. Thus, piston 44 and its associated piston rod 37 are locked in position to positively hold towing pin 22 in engagement with socket 16 so that positive towing of the trailer may be effected.

When the trailer has been towed to a predetermined location, the control lever 51 is moved to the fourth operative position shown in FIG. 11 in which channel 59 is aligned with ports 55 and 56 and channel 61 is aligned with ports 54 and 57. In that position, hydraulic fluid pumped from the reservoir flows in the direction noted by the arrows and is introduced into the cylinder beneath piston 44 to raise the same and piston rod 37 therewith which effects retraction of the towing mechanism and towing pin 22 from socket 16. Thus, the towing pin may be rapidly retracted from the socket with which it had been interengaged so that the tractor may be moved away from the previously towed trailer.

It should be understood that the control lever 51 for the hydraulic mechanism is conveniently mounted within the cab 18 of the tractor for ready access by the driver thereof. It should also be understood that one such control lever is provided within the tractor cab for regulating the operation of the towing mechanism provided at each of the opposite sides of the tractor.

From the foregoing, it should be understood that this invention relates to an improved arrangement for effecting towing of vehicles, such as aircraft ground support trailers, from either side thereof by means of novel towing mechanism provided on a towing vehicle and novel socket structure provided at predetermined positions on the vehicle to be towed.

While the foregoing disclosure is exemplary of one preferred embodiment of the invention, attention is directed to the appended claims for the scope of protection to be afforded thereto.

I claim:

1. For use in combination with a tractor having towing mechanism mounted thereon which imparts side tow capability thereto, a towable trailer or like vehicle which includes towing structure mounted on the side frame of said trailer adjacent an end thereof; said structure comprising a socket positioned to receive therein a member of the towing mechanism of said tractor, a guide ramp mounted on said trailer side frame adjacent said socket, said ramp having an inclined section which opens onto said socket so that engagement of said towing member on said tractor with said socket is facilitated, and an extension in conjunction with said socket having a cut out portion opening toward said guide ramp to further facilitate interengagement of said towing member with said socket; so that towing of said trailer from the side thereof may be effected upon movement of said tractor with said towing member of said towing mechanism and said towing structure interengaged.

2. The trailer of claim 1 which includes more than one of said towing structures mounted thereon at spaced locations.

3. The trailer of claim 1 which includes four of said towing structures mounted thereon, said towing structures being positioned adjacent opposite ends of said trailer and at opposite sides thereof.

4. The trailer of claim 3 in which the towing structures at opposite ends of said trailer on each side thereof are oppositely oriented relative to each other so that the guide ramps thereof extend toward each other.

5. The trailer of claim 1 which includes a plurality of said towing structures mounted in said trailer side frame at predetermined spaced locations so that said trailer may be towed from opposite ends and from opposite sides thereof.

6. The trailer of claim 1 in which said socket comprises a generally vertically arranged hollow open ended member secured to said trailer side frame.

7. The trailer of claim 1 in which said guide ramp includes side walls to prevent lateral separation of said towing member from said ramp during movement of said member along said ramp as said member and said socket are being interengaged.

8. For use in combination with a trailer having towing structure mounted thereon which imparts side tow capability thereto, a towing tractor having towing mechanism mounted thereon, comprising a selectively movable framework, a towing member connected with said framework and movable to an extended position in which it is interengageable with said trailer towing structure, means for effecting selective extension and retraction of said framework and said towing member therewith, and control means for regulating the position of said framework.

9. The tractor of claim 8 in which said towing member comprises an elongated rigid pin to be received within a socket forming part of said towing structure on said trailer to be towed.

10. The tractor of claim 8 in which said towing mechanism is mounted on a side of said tractor for lateral extension and retraction relative to said side.

11. The tractor of claim 8 which includes a second said towing mechanism mounted on the other side of said tractor for selective extension and retraction relative to said other side, whereby said tractor may engage and tow a trailer from either side thereof.

12. The tractor of claim 8 in which said control means includes fluid valve structure for regulating a fluid cylinder to selectively effect extension, retraction, locking, or free movement of said framework relative to said tractor.

13. In combination, a trailer, and a tractor for towing said trailer from a side thereof; said trailer including towing structure mounted on the side frame of said trailer adjacent an end thereof; said tractor including towing mechanism mounted thereon comprising a selectively movable framework, a towing member connected with said framework and movable to an extended position in which it is interengageable with said towing structure on said trailer; means for effecting selective extension and retraction of said framework and said towing member therewith so that interengagement of said towing member with said trailer towing structure may be effected without manual intervention between the tractor and trailer; and control means for regulating the position of said framework relative to said tractor and said trailer; said tractor and trailer being operatively interengageable through said towing structure and said towing mechanism so that said trailer may be towed by said tractor from said side thereof.

14. The combination of claim 13 in which said trailer includes a plurality of said towing structures mounted thereon at spaced locations adjacent one or more ends thereof, whereby said trailer may be side towed by said tractor from more than one position.

15. The combination of claim 13 in which said trailer includes four of said towing structures mounted thereon, said towing structures being positioned adjacent opposite ends of said trailer and at opposite sides thereof.

16. The trailer of claim 15 in which the towing structures at opposite ends of said trailer on each side thereof are oppositely oriented relative to each other so that the guide ramps thereof extend toward each other.

17. The combination of claim 13 in which said towing structure of said trailer includes a socket to receive said towing member therein, and a guide ramp mounted on said trailer side frame adjacent said socket, said ramp having an inclined section which opens onto said socket so that engagement of said towing member on said tractor with said socket is facilitated.

18. The combination of claim 17 in which said towing member comprises an elongated rigid towing pin which is selectively receivable in said socket when said tractor and trailer are coupled for towing.

19. The combination of claim 13 in which said tractor includes a second said towing mechanism mounted on the other side of said tractor for selective extension and retraction relative to said other side, whereby said tractor may engage and tow a trailer from either side thereof.

20. The combination of claim 13 in which said towing mechanism includes control means for regulating the position of said framework, said control means comprising fluid valve structure for regulating a fluid cylinder to selectively effect extension, retraction, locking, or free movement of said framework relative to said tractor.

21. For use in combination with a tractor having towing mechanism mounted thereon which imparts side tow capability thereto, a double-ended towable trailer or like vehicle which is designed to be moved with either of its opposite ends leading and which may be coupled with or uncoupled from a tractor without manual intervention between said trailer and tractor to effect such coupling or uncoupling; said trailer including towing structure mounted on the side frame of said trailer adjacent each of the opposite ends thereof which is automatically engageable with a tractor without manual intervention, each said towing structure comprising a vertically oriented socket positioned to receive therein a member of the towing mechanism of said trailer, a guide ramp mounted on said trailer side frame adjacent said socket, said ramp having an upwardly inclined section which opens onto said socket so that engagement of said towing member on said tractor with said socket may be effected without manual intervention; so that towing of said trailer from either side thereof and in either direction may be effected upon movement of said tractor with said towing mechanism and one of said towing structures interengaged.

22. The trailer of claim 21 in which the towing structures at opposite ends of said trailer on each side thereof are oppositely oriented relative to each other so that the guide ramps thereof extend toward each other.

23. The trailer of claim 21 in which each of said sockets comprises a vertically extending cylindrical member which is hollow to receive a portion of the tractor towing mechanism therein, said cylindrical member including an extension thereof at its upper end having a cut out portion opening toward its associated guide ramp to further facilitate interengagement of said tractor towing mechanism with such socket without requiring manual intervention to effect such interengagement.

24. The trailer of claim 21 in which each said guide ramp includes sidewalls to prevent lateral separation of said towing mechanism of said tractor from said ramp during movement of said mechanism along said ramp as said mechanism and a socket are being interengaged.

25. For use in combination with a trailer having towing structure mounted thereon which imparts side tow capability thereto, a towing tractor having selectively extensible and retractable towing mechanism mounted on each side of said tractor for selective extension and retraction relative to an associated side whereby said tractor may engage and tow a trailer from either side thereof; each said mechanism comprising a selectively movable framework pivotally connected with a tractor side, a pivotal towing member hingedly connected with said framework and movable under the effects of gravity to an extended position in which it is interengageable with said trailer towing structure when said trailer is located adjacent such towing structure, means for effecting selective extension of said framework and said towing member therewith into engagement with said towing structure and for permitting vertical upward and downward movement of said framework relative to said towing structure when such interengagement is effected so that such towing member may be automatically engaged with a socket in said towing structure without requiring manual intervention to effect such interengagement, said means further effecting locking of said framework and said towing member in a fixed position upon interengagement of said towing member with said towing structure socket and for effecting selective retraction thereof from said socket without requiring manual intervention to effect such retraction; and manually actuatable control means for selectively regulating and position of said framework relative to said towing structure socket and for regulating the condition of said towing mechanism during coupling or uncoupling of said tractor with said trailer.

26. The tractor of claim 25 in which said control means includes a hydraulic fluid valve structure for regulating a fluid cylinder operatively interposed between said trailer and said framework to selectively effect extension, retraction, locking or free movement of said framework with said towing member thereon relative to said tractor.

27. The tractor of claim 25 in which said towing member comprises an elongated rigid pin pivotally mounted on said framework and movable under the effects of gravity to be selectively received within said towing structure socket on said trailer to be towed.

* * * * *